United States Patent

Roopnarine et al.

[11] Patent Number: 6,046,527
[45] Date of Patent: Apr. 4, 2000

[54] ULTRASONIC POSITIONER WITH MULTIPLE DEGREES OF FREEDOM OF MOVEMENT

[75] Inventors: Roopnarine, New York, N.Y.; John D. Vranish, Crofton, Md.

[73] Assignee: Honeybee Robotics, Inc., New York, N.Y.

[21] Appl. No.: 08/887,811

[22] Filed: Jul. 3, 1997

Related U.S. Application Data

[60] Provisional application No. 60/021,897, Jul. 5, 1996.

[51] Int. Cl.$^7$ .................................................. H01L 41/08
[52] U.S. Cl. ................................ 310/323.06; 310/323.03
[58] Field of Search ...................................... 310/323, 328

[56] References Cited

U.S. PATENT DOCUMENTS

| | | | |
|---|---|---|---|
| 4,983,875 | 1/1991 | Masaki et al. | 310/323 |
| 5,760,528 | 6/1998 | Tomikawa | 310/323 |

FOREIGN PATENT DOCUMENTS

| | | | |
|---|---|---|---|
| 0141978 | 6/1987 | Japan | 310/323 |
| 0202378 | 8/1990 | Japan | 310/323 |
| 0202379 | 8/1990 | Japan | 310/323 |
| 0202380 | 8/1990 | Japan | 310/323 |
| 0202382 | 8/1990 | Japan | 310/323 |
| 0228272 | 9/1990 | Japan | 310/323 |

OTHER PUBLICATIONS

Array–Driven Ultrasonic Microactuators by Furuhata et al IEEE, 1991. pp. 1056–1059.

*Primary Examiner*—Mark O. Budd
*Attorney, Agent, or Firm*—Leighton K. Chong

[57] ABSTRACT

An ultrasonic positioning system having multiple degrees of freedom of movement includes an array of piezoelectric ceramic elements grouped in pairs of adjacent ceramic elements of opposite deformation responses aligned in a first direction and also pairs aligned in a second direction, an elastic body bonded to the ceramic elements, and a moving body movably supported on the elastic body for movement in at least the two directions. The pairs of ceramic elements are activated with offset pairs of ceramic elements by electrical signals offset in phase to generate a traveling wave for driving the moving body. In a preferred embodiment, the ceramic elements have a length to width ratio of 2:1 with their lengths aligned in the X direction and widths aligned in the Y direction. When excitation signals having a frequency corresponding to either their length or width are applied, the ceramic elements can vibrate in two modes to drive the moving body in the X or Y direction. Another embodiment provides three degrees of freedom by arranging the ceramic elements in four linear beams in parallel sets of two beams each for driving a rotor in the X direction and in the Y direction, respectively, and in rotary motion when opposite traveling waves are generated in each set of parallel beams. The ceramic elements may also be arranged on a spherical surface to drive a body in pitch and yaw motions, or by combining an upper hemispherical assembly for pitch and yaw motions and a lower hemispherical assembly for roll motion to provide three degrees of freedom of movement.

10 Claims, 6 Drawing Sheets

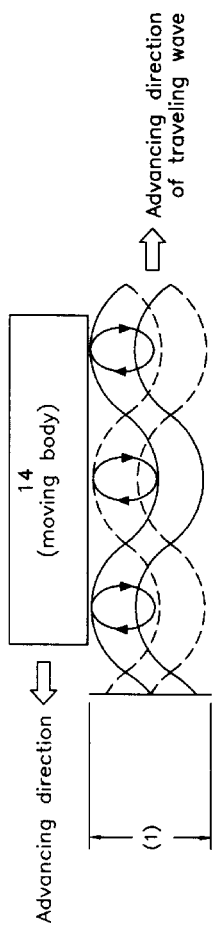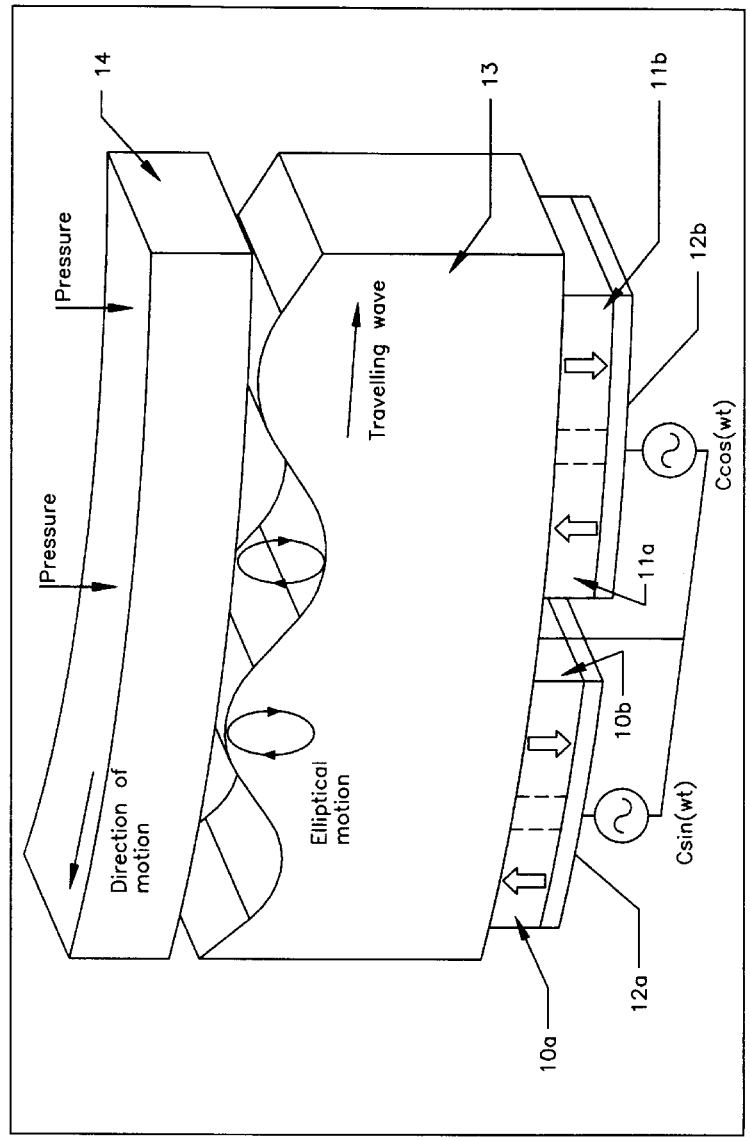

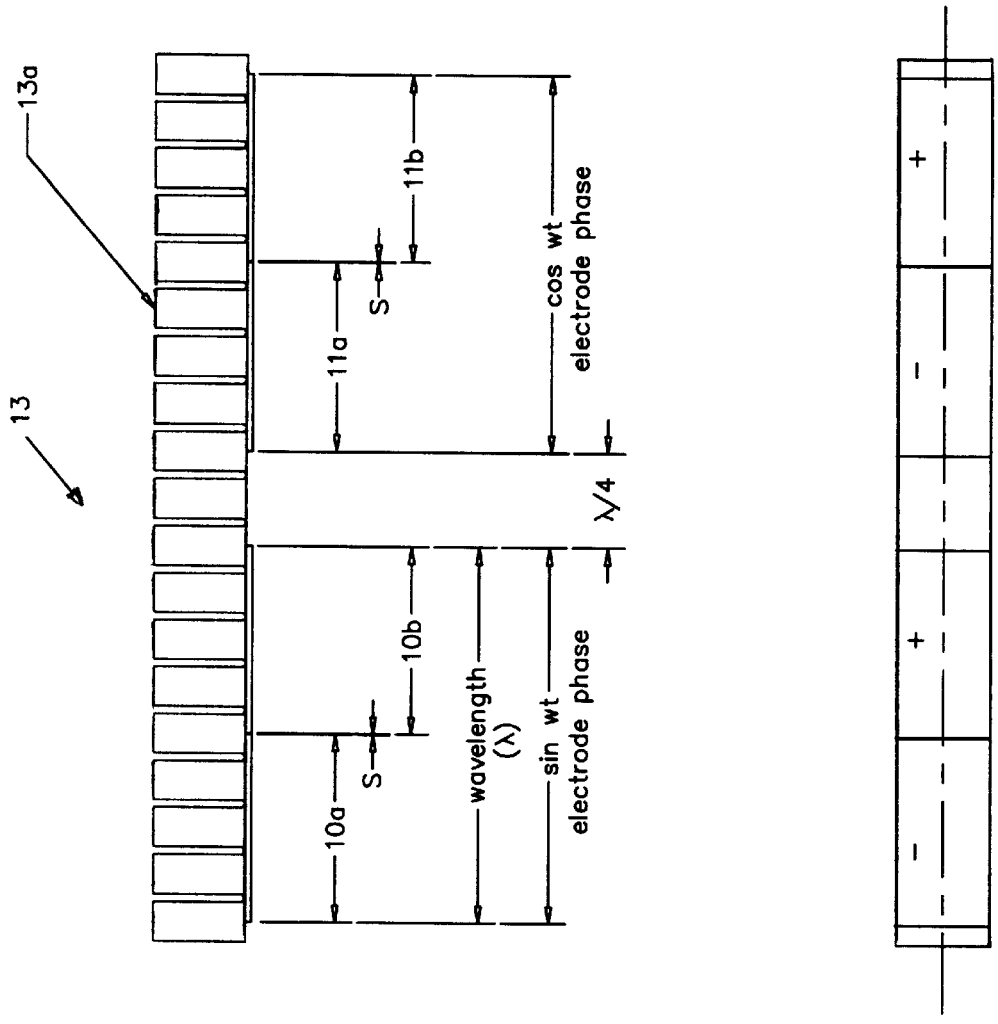

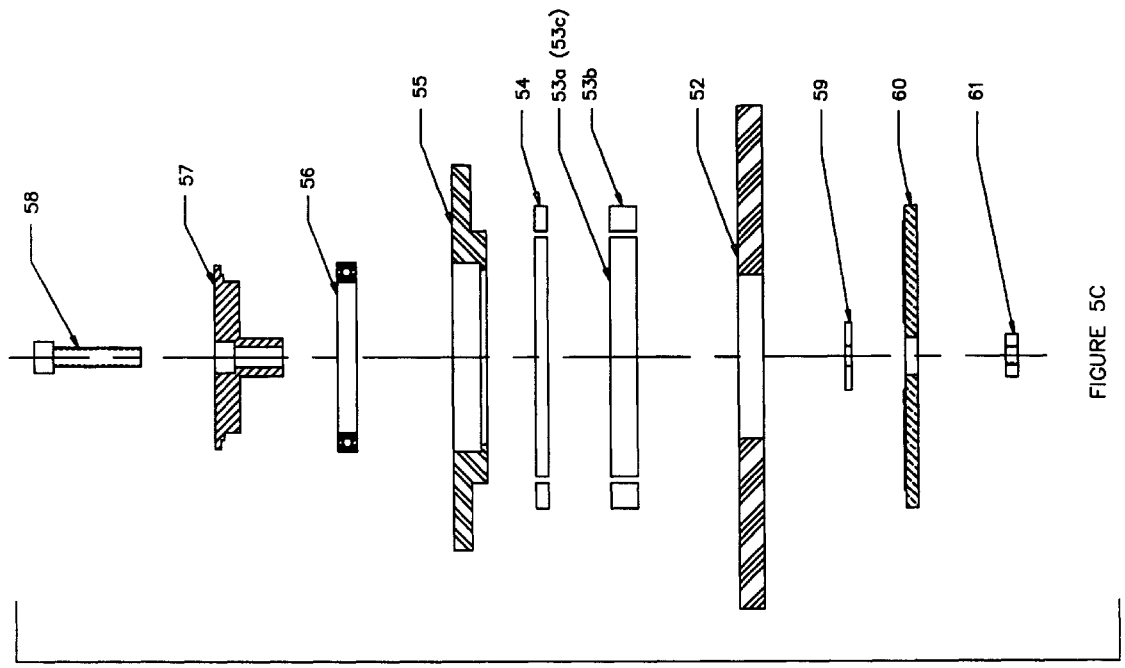
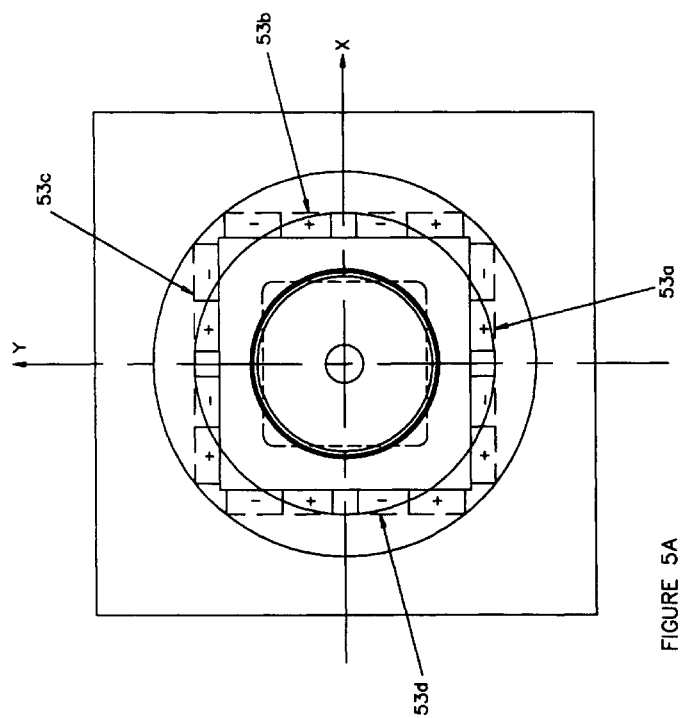
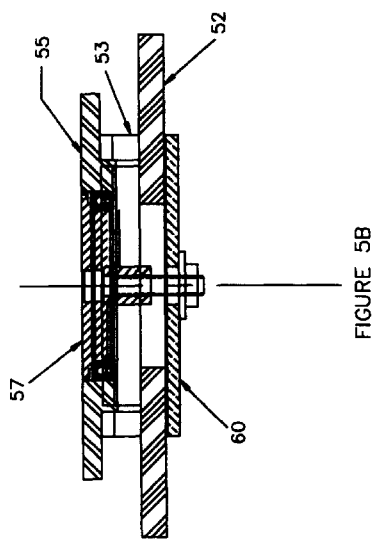

ASSEMBLED VIEW (NEUTRAL POSITION)

ASSEMBLED VIEW (PITCH)

ASSEMBLED VIEW (YAW)

ULTRASONIC POSITIONER WITH MULTIPLE DEGREES OF FREEDOM OF MOVEMENT

This U.S. patent application claims the priority of U.S. Provisional Application No. 60/021,897 filed on Jul. 5, 1996.

FIELD OF THE INVENTION

This invention generally relates to an apparatus for controlled positioning of an object, and particularly for positioning an object with movement in multiple degrees of freedom.

BACKGROUND ART

Prior art positioners have generally provided one or two degrees of freedom of linear or rotary motion driven by electromagnetic control. Some electromagnetic positioners have provided three degrees of freedom of movement with a staged system in which two positioners with independent axes are placed one on top of the other and driven by separate or independent actuators/drives. Such staged systems are usually not compact, can produce interference between sensitive electronics, and require the use of air bearings and a mechanism to provide braking or holding torque. They also invariably require multiple actuators, which adds to their bulk and mechanical complexity.

Ultrasonic positioners have been developed which rely on positioning movement by ultrasonic excitation of piezoceramics. The piezoceramics are bonded to an elastic body and produce small movements which drive a moving element placed in preloaded contact with the elastic body, so as to result in linear or rotary motion of the driven element. Ultrasonic positioning systems are capable of micropositioning of mirrors, lenses and cameras where focusing, alignment and tuning are required, as well as other applications. However, they have had some of the same problems as electromagnetic positioners. The conventional ultrasonic positioners are staged to obtain multiple degrees of freedom, and have required multiple, separate actuators.

SUMMARY OF THE INVENTION

It is therefore a principal object of the present invention to provide a compact, multiple degrees-of-freedom ultrasonic positioning system capable of micropositioning of an object (such as mirrors, lenses, cameras, probes, etc.) with a fine degree of control using a simple mechanical structure. Such a system should not require lubrication, and should be of low mass and have a high degree of reliability. It is a further object of the invention to provide multiple degrees of freedom for positioning by superimposing the application of ultrasonic waves to control a unique arrangement of piezoceramic elements and associated structures, without the need for a staged construction and multiple, separate actuators.

In accordance with the present invention, the ultrasonic positioning system having multiple degrees of freedom of movement comprises:

(a) a plurality of piezoelectric ceramic elements, each capable of an elastic deformation response when an electrical signal is applied thereto, bonded in electrical contact with respective electrodes;

(b) an elastic body bonded in physical contact with deformable surfaces of the ceramic elements;

(c) a moving body movably supported in physical contact on the elastic body;

(d) wherein the ceramic elements are grouped in pairs of adjacent ceramic elements having opposite deformation responses aligned in a first direction, and also pairs of adjacent ceramic elements of opposite deformation responses aligned in a second direction; and (e) means, including respective electrodes bonded to the ceramic elements, for applying an alternating electrical signal to produce a cyclic deformation response in the ceramic element pairs aligned in the first direction to produce a traveling wave for moving the moving body in the first direction, and for applying another alternating electrical signal to produce a cyclic deformation response in the ceramic element pairs aligned in the second direction to produce a traveling wave for moving the moving body in the second direction, whereby at least two degrees of freedom of movement in the first and second directions are obtained.

Each pair of ceramic elements is paired with another like-pair of ceramic elements spaced apart by an offset phase distance and aligned therewith in each direction, and said paired pairs of ceramic elements are bonded in electrical contact to respective ones of a pair of electrodes, and alternating electrical signals offset in phase are applied to the respective electrodes to generate a traveling wave in the elastic body for moving the moving body in each direction.

In one preferred embodiment, an array of rectangular ceramic elements, of different length and width, are grouped in pairs of ceramic elements of opposite deformation responses aligned with their lengths in an X direction and their widths in a Y direction. The array of ceramic elements are arranged to vibrate in two modes. When an excitation signal of a first frequency corresponding to the length of the ceramic elements is applied, the ceramic element pairs aligned in the X direction produce a cyclic deformation response in the X direction, and when an excitation signal of a second frequency corresponding to the width of the ceramic elements is applied, the ceramic element pairs aligned in the Y direction produce a cyclic deformation response in the Y direction. A preferred length to width ratio is 2:1.

In another embodiment having three degrees of freedom, the electrodes, ceramic elements, and elastic bodies are arranged in four linear beams, with two beams aligned in parallel in the X direction and two beams in parallel in the Y direction. A movable rotor is supported in preloaded contact on the beams. When excitation signals are applied to each two parallel beams to generate traveling waves in the same X or Y direction, linear movement in the X or Y direction results. When excitation signals are applied to each two parallel beams to generate traveling waves in the opposite X or Y direction, rotary motion of the rotor results.

In a further embodiment, ceramic elements capable of vibrating in two modes, as described previously, are arranged to form a spherical surface, and a moving body is driven in two degrees of freedom of pitch and yaw movement over the spherical surface. When the two-mode assembly is combined with a rotary motion assembly, three degrees of freedom of roll, pitch and yaw motions are obtained. In other embodiments, two assemblies having two degrees of freedom each may be superimposed to double the range of their output.

Other objects, features and advantages of the present invention are described in detail below in conjunction with the drawings, as follows:

BRIEF DESCRIPTION OF THE DRAWINGS

FIGS. 1A and 1B are schematic diagrams illustrating the use of phased electrical signals applied to piezoelectric ceramic elements for generating a traveling wave for driving a moving body in a direction of movement.

FIGS. 2A and 2B are schematic diagrams of ceramic elements bonded to an elastic body in the form of a slotted comb.

FIGS. 5A, 5B, 5C and 5D are plan, side, side assembly and plan assembly views, respectively, of an ultrasonic positioning system having an arrangement of X and Y pairs of linear beams for producing X and Y and rotary motion in three degrees of freedom.

DETAILED DESCRIPTION OF THE INVENTION

Figure 4:
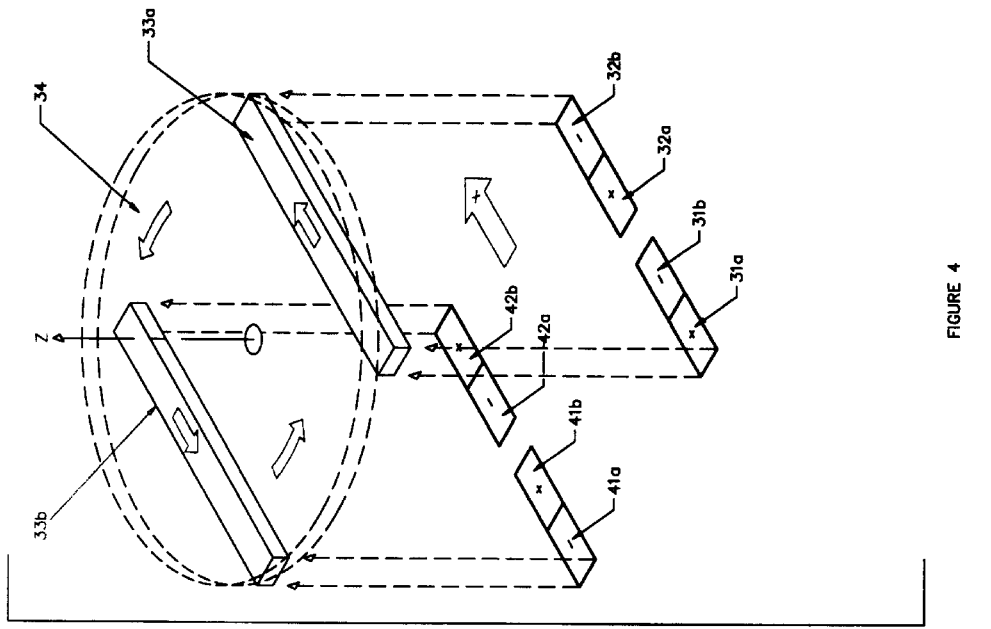
FIG. 4 is a schematic diagram showing the use of two linear beams moved by oppositely phased excitation signals to produce rotary motion.

Referring to FIGS. 1A and 1B, the basic principle of producing controlled movement using piezoelectric ceramic elements in an ultrasonic positioner will now be explained. Two pairs of piezoelectric ceramic elements 10a, 10b and 11a, 11b are arranged spaced apart and aligned in a given direction (horizontal direction in the figures). In each pair, the ceramic elements are arranged adjacent to each other and attached (bonded) on one side in electrical contact with an electrode, i.e., electrode 12a to ceramic elements 10a, 10b and electrode 12b to ceramic elements 11a, 11b.

An elongated elastic body 13 capable of elastic deformation is attached (bonded) in physical contact with the other side of the ceramic elements. The elastic body 13 also serves as the ground contact for an electrical signal to be applied across the ceramic elements. The elastic body is preferably in the form of a beam made of conductive, elastically deformable material or, alternatively, a slotted comb structure made of conductive, rigid material with spacings between comb teeth to accommodate and also amplify the mechanical deformations of the ceramics. An elongated moving body 14 is movably supported in preloaded pressure contact on the elastic body 13.

One ceramic element in each pair is made of a material that deforms (expands) in one direction when a positive voltage is applied to it, and deforms (contracts) in the opposite direction when a negative voltage is applied. The other ceramic element in each pair is made of a different material that responds in an opposite manner. Ceramic elements having opposite deformation responses are referred to herein as having opposite polarities, indicated in FIG. 1A by an upward arrow for the left-hand ceramic element of each pair, and a downward arrow for the right-hand ceramic element. When an alternating electrical signal of a given frequency is applied to each ceramic element pair, opposite deformation responses are produced in up-and-down cycles that result in a small elliptical motion on the surface of the elastic body.

The ceramic element pair 10a, 10b is aligned with the adjacent ceramic element pair 11a, 11b and spaced apart by an offset spacing corresponding to a predetermined phase offset, e.g., ¼ wavelength. When an alternating electric signal Csin(wt) is applied to the ceramic element pair 10a, 10b, and a signal Ccos(wt) (offset 90° in phase) is applied to the ceramic element pair 11a, 11b, they generate respective elliptical up-and-down motions offset in phase that are transmitted through the elastic body 13 as a traveling wave (moving in the right-hand direction of the figure). As illustrated in FIG. 1B, the advancing direction of the traveling wave in the elastic body 13 results in movement of the moving body 14 supported thereon in the opposite direction.

In FIGS. 2A and 2B, the preferred arrangement and spacing for the electrodes and ceramic elements are shown in greater detail. For the elastic body, a slotted comb 13 is used having a series of comb teeth 13a. The ceramic elements are bonded to the continuous side of the comb 13 which also serves as the ground electrode. The ceramic elements 10a, 10b and 11a, 11b have a given length, e.g., 0.500", and are separated by a small spacing S, e.g., 0.002", between them. The length of each ceramic element spans 4 comb teeth, and each ceramic element pair spans 8 comb teeth corresponding to a wavelength of the resulting traveling wave. A spacing of ¼ wavelength is provided between adjacent ceramic element pairs corresponding to the 90° phase offset of the respective electrode signals Csin(wt) and Ccos(wt) applied to each pair. The opposite deformation responses of the ceramic element pairs are indicated by "+" and "−" in FIG. 2B.

Figure 3:
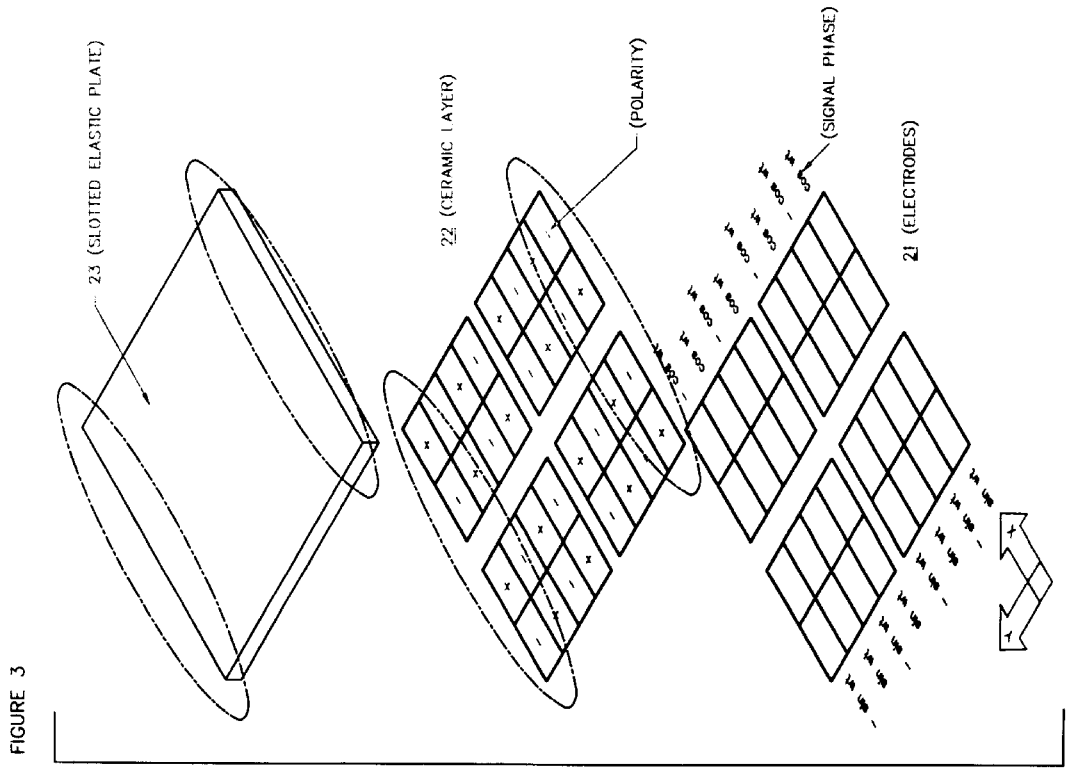
FIG. 3 shows an assembly view of an ultrasonic positioning system in accordance with the invention capable of vibrating in two modes to provide two degrees of freedom of movement.
Figure 5D:
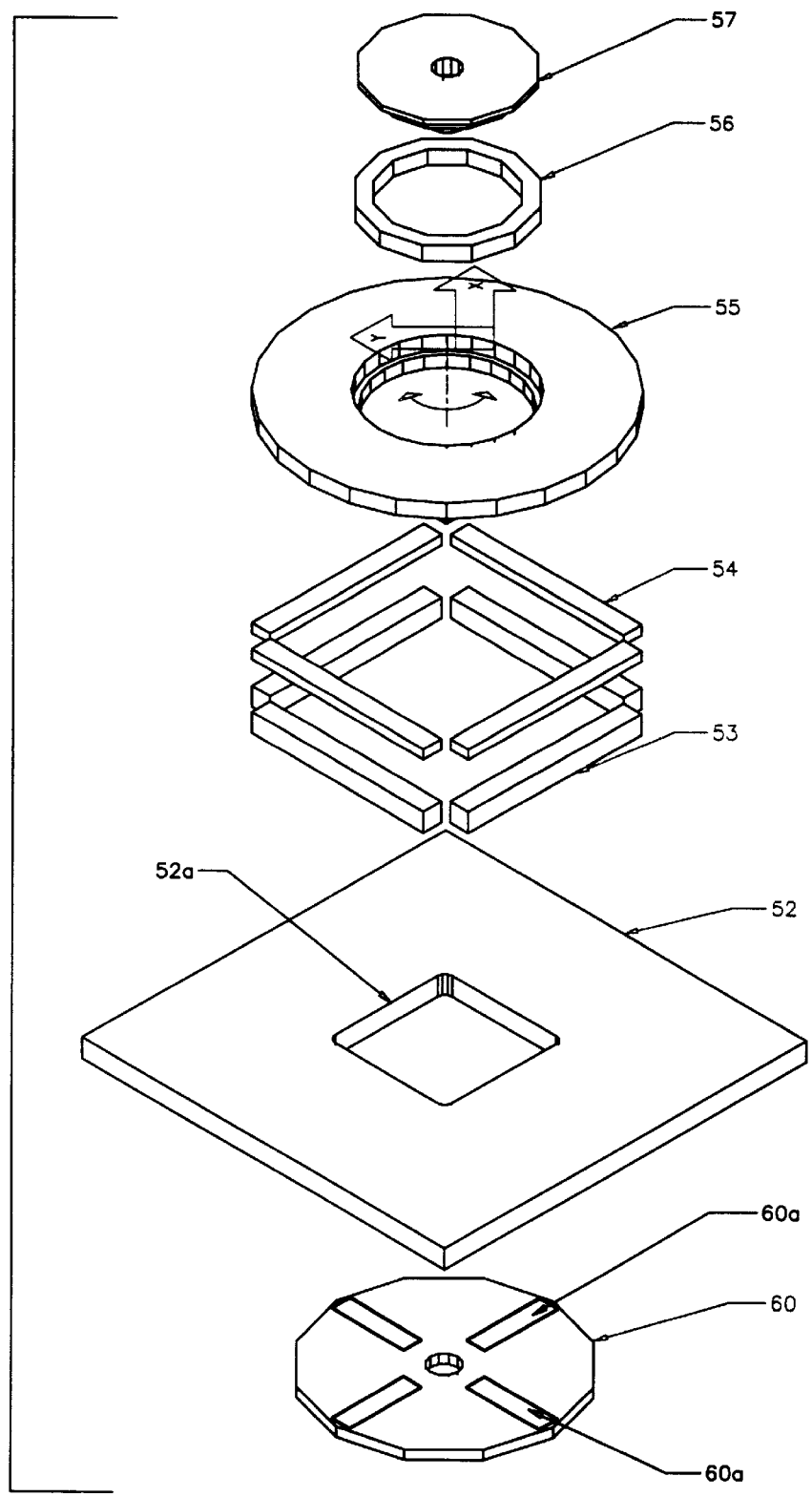
Figure 6B:
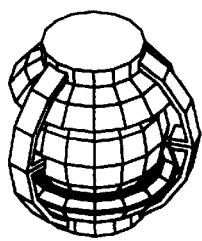
FIGS. 6A, 6B, 6C and 6D are assembly and positioning views of an ultrasonic positioning system having spherical positioning assemblies for producing pitch, yaw, and roll movements in two or three degrees of freedom.
Figure 6C:
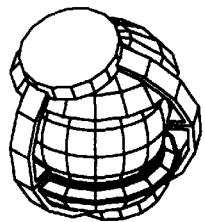
Figure 6D:
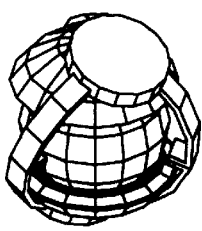
Figure 6A:
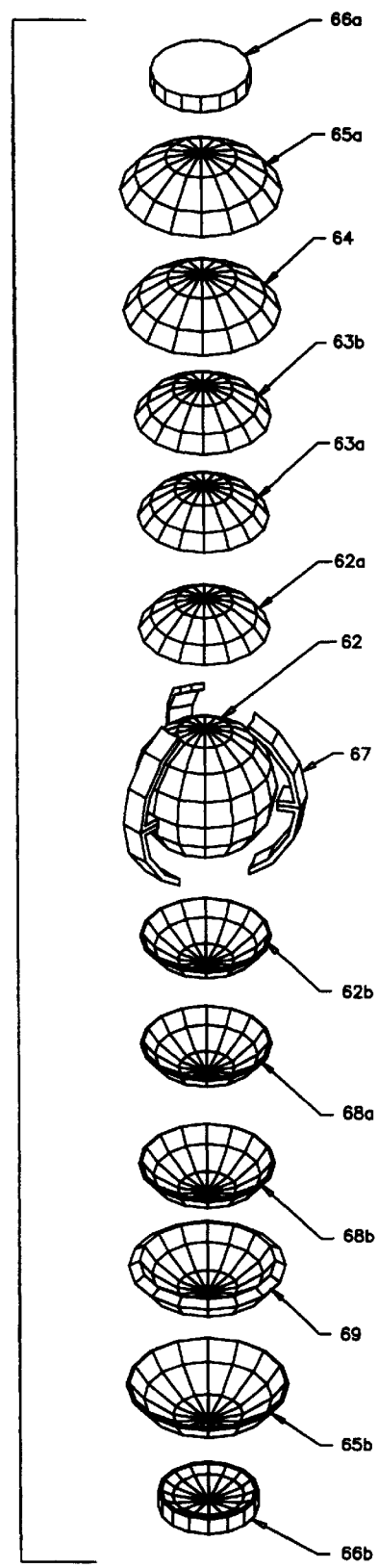

In one preferred embodiment of the invention shown in FIG. 3, the principle of ultrasonic (piezoelectric element) driving is adapted to provide excitation of a ceramic element array in two modes for movement in two degrees of freedom. An array of 32 piezoelectric ceramic elements 22 are arranged in groups of 8 elements each, placed in electrical contact with respective ones of a corresponding array of electrodes 21. Each ceramic element has a length different than its width, for example, a ratio of 2:1 in the embodiment shown. The ceramic elements are arranged with their lengths aligned in the X direction and their widths aligned in the Y direction. Each ceramic element is paired with an adjacent element of opposite polarity (indicated by "+" and "−" signs) to produce an up-and-down deformation response when an alternating excitation signal is applied.

In the arrangement shown, each ceramic element pair is paired with a like ceramic element pair spaced apart by an offset distance (¼ length-wavelength) in the X direction. Because of the 2:1 length-to-width ratio, each set of 4 ceramic elements is paired with a like set of 4 ceramic elements spaced apart by an offset distance (¼ width-wavelength) in the Y direction. An elastic body 23 in the form of a plate having teeth slotted in the X and Y directions, is bonded in physical contact with the deformable surfaces of the ceramic elements 22. The moving body is not shown in this figure.

The ceramic elements in the paired groupings can be made to vibrate in two modes depending on the excitation frequency. When the ceramic element groupings are excited with phased excitation signals having a frequency corresponding to the length of the ceramic elements, up-and-down deformation cycles are generated to produce a traveling wave in the X direction, whereas an undifferentiated response is produced across the ceramic elements in the Y direction. Conversely, when the ceramic element groupings are excited with phased excitation signals having a frequency corresponding to the width of the ceramic elements, up-and-down deformation cycles are generated to produce a traveling wave in the Y direction, whereas an undifferentiated response is produced across ceramic elements in the X direction. Thus, the ceramic elements 22 are capable of vibrating in two modes to move a moving body placed in preloaded contact with the elastic plate 23 in the X and Y directions. Two degrees of freedom of positioning movement are therefore obtained by varying the excitation frequency in two modes using the same arrangement of electrodes, ceramic elements, and elastic body.

In FIG. 4, an ultrasonic positioning assembly using two parallel linear beams for producing rotary motion (one degree of freedom) is illustrated schematically. One linear beam 33a has spaced-apart pairs of ceramic elements 31a, 31b and 32a, 32b of opposite deformation response (indicated by opposite signs) aligned in the X direction. The ceramic element pairs are bonded in contact with respective electrodes applying excitation signals offset 90° in phase in order to produce a traveling wave in the linear beam 33a in the X direction. Another linear beam 33b similarly has spaced-apart pairs of ceramic elements 41a, 41b and 42a, 42b also aligned in the X direction and bonded in contact with respective electrodes. The polarity of the ceramic elements in linear beam 33b may be in opposite polarity sequence to those in linear beam 33a (as shown) and driven by an excitation signal of the same phase. Alternatively, they may be in the same polarity sequence (not shown) but excited with an excitation signal of opposite phase. In either case, the result is to produce a travelling wave in the other linear beam 34a moving oppositely in the X direction. The oppositely traveling waves in the parallel linear beams 33a, 33b generate rotary motion in a rotor 34, which is supported on the beams but constrained to rotate on an axis AX. Advancing the phase of the excitation signals 180° causes the rotor to rotate in the opposite direction.

In FIGS. 5A, 5B, 5C and 5D, another preferred embodiment of an ultrasonic positioning system with three degrees of freedom of movement is shown having four linear beams arranged in a square configuration. In this embodiment, the four linear beams are arranged in parallel pairs 53a, 53c and 53b, 53d aligned in the X and Y directions, respectively. Each beam includes two spaced-apart ceramic element pairs of opposite deformation response (polarity indicated by signs) aligned lengthwise with each other. For example, each beam has four ceramic elements, of 0.015" thickness×0.250" width×0.500" length, epoxied with conductive adhesive onto a metallic slotted beam or comb. The ceramic element pairs are bonded to respective electrodes 54 by sections of conductive tape. The space between electrode pairs is equal to one quarter the wavelength of the traveling wave (or 0.250"). When the parallel linear beams in the X or Y direction are excited to produce traveling waves in the same direction, linear translation movement of the rotor 55 in the X or Y direction results. When the parallel linear beams are excited to produce traveling waves in opposite directions, rotary motion of the rotor 55 results.

The beams are arranged in a square configuration around a central opening of a planar support plate 52, which acts as a ground, and the rotor 55 is assembled in preloaded contact on the beams by a contact bearing 56, a preloading shaft 57, a screw 58, a washer 59, preloading disk 60, and nut 61. The preloading of the beams and rotor via the four-point contact bearing and preloading disk allows the rotor to rotate relative to the preloading shaft and preloading disk when rotary motion is required. The central opening 52a in the support plate 52 is a square aperture large enough to allow the lower portion of the screw 58, secured through the preloading disk 60, to move in X and Y directions when the rotor in driven in translational movement. During translational motions (in any direction) the entire assembly of the rotor (with the attached beams) and preloading system move together. This unit was tested successfully with sine and cosine (90 degrees phase shift) excitation signals applied to the electrodes at 60V (peak to peak) and at 34.5 kHz.

The preloading disk and rotor can include additional bearings that are load carrying and allow the rotor to move without resistance. Alternatively, as a unique way to reduce the friction that arises from preloading the system, the preloading disk can have (epoxied to it) ceramic elements 60a that are vibrated during the translational motions of the rotor in order to provide an ultra-low coefficient of friction between the support plate and the disk. These elements 60a are not excited during rotary motion of the rotor.

The above system's output can be doubled by using, instead of the preloading disk 60, another complete set of beams and rotor assembly. This second rotor assembly can replace the preloading disk, and the entire unit is preloaded when the two rotor assemblies are placed in contact with the ground plate and bolted together.

In FIGS. 6A, 6B, 6C and 6D, another embodiment of an ultrasonic positioning system is shown having spherical positioning assemblies for producing pitch and yaw movements for two degrees of freedom, or pitch, yaw, and roll movements for three degrees of freedom. A spherical body 62 provides a central support and ground contact through electrode layers 62a, 62b. A pair of offset upper hemispherical layers 63a, 63b carrying piezoelectric ceramic elements capable of vibrating in two modes, as explained previously with respect to FIG. 3, is supported on the upper half of the spherical body 62. Another pair of lower hemispherical layers 68a, 68b of ceramic elements also capable of vibrating in two modes may be arranged at the lower half of the spherical body 62 to generate a doubled, balanced output of driving forces.

The ceramic elements have one dimension thereof aligned in a pitch direction and another dimension thereof aligned in a yaw direction. The paired hemispherical layers are superimposed with an offset of one-quarter wavelength for application of phased excitation signals to produce traveling waves in the upper and lower elastic bodies 64 and 69 in the pitch and yaw directions. Upper and lower positioner plates 66a, 66b are secured together through links 67 and ride on the ceramic layers through anti-friction liners 65a, 65b.

Alternatively, an upper hemispherical assembly of ceramic elements in offset layers capable of vibrating to drive the upper positioner plate 66a in pitch and yaw motions can be combined with a lower hemispherical assembly of ceramic elements in offset layers capable of driving the lower positioner plate 66b in rotary (roll) motion. The ceramic elements of the lower hemispherical assembly are arranged in curvilinear beams aligned in a converging direction for driving the positioner plate 66b supported thereon in roll motion. With the positioner plates 66a and 66b coupled together by the linkages 67, the combination of driving outputs provide three degrees of freedom of pitch, yaw, and roll motions to an object coupled to the positioner plates.

The several embodiments of the invention thus illustrate related approaches to providing a compact, multi-degrees-of-freedom positioning system that is capable of providing positioning with a relatively high torque/volume ratio, fail-safe braking, no lubrication, and no electromagnetic interference. The disclosed systems have low mass and only a few mechanical parts arranged in a simple geometrical arrangement. Each degree-of-freedom is obtained by activating the same assemblies of vibrating beams, thereby maximizing efficiency and outputs. The invention does not require the staging of separate single-motion assemblies to provide multi-degrees-of-freedom positioning.

Optimization of performance can be obtained with respect to suitable selection of material types, efficiency, compactness and controllability. Additionally, appropriate sensors can be selected to provide position/velocity feedback and the integration of these into the positioner.

Although the invention has been described with reference to certain preferred embodiments, it will be appreciated that many other variations and modifications thereof may be devised in accordance with the principles disclosed herein. The invention, including the described embodiments and all variations and modifications thereof within the scope and spirit of the invention, is defined in the following claims.

We claim:

1. An ultrasonic positioning system having multiple degrees of freedom of movement comprising:
    (a) a plurality of piezoelectric ceramic elements, each capable of an elastic deformation response when an electrical signal is applied thereto, bonded in electrical contact with respective electrodes;
    (b) an elastic body bonded in physical contact with deformable surfaces of the ceramic elements;
    (c) a moving body movably supported in physical contact on the elastic body;
    (d) wherein the ceramic elements are grouped in pairs of adjacent ceramic elements of opposite deformation responses aligned in a first direction, and also pairs of adjacent ceramic elements of opposite deformation responses aligned in a second direction; and
    (e) means, including respective electrodes bonded to the ceramic elements, for applying an alternating electrical signal to produce a cyclic deformation response in the ceramic element pairs aligned in the first direction to produce a traveling wave for moving the moving body in the first direction, and for applying another alternating electrical signal to produce a cyclic deformation response in the ceramic element pairs aligned in the second direction to produce a traveling wave for moving the moving body in the second direction, whereby at least two degrees of freedom of movement in the first and second directions are obtained;
wherein an array of rectangular ceramic elements, each having a length different from its width, are grouped in pairs of ceramic elements of opposite deformation responses aligned with their lengths in an X direction and their widths in a Y direction, said array of ceramic elements being arranged for vibrating in two modes such that when an excitation signal of a first frequency corresponding to the length of the ceramic elements is applied, the ceramic element pairs aligned in the X direction produce a cyclic deformation response in the X direction, and when an excitation signal of a second frequency corresponding to the width of the ceramic elements is applied, the ceramic element pairs aligned in the Y direction produce a cyclic deformation response in the Y direction.

2. An ultrasonic positioning system according to claim 1, wherein the ceramic elements have a length to width ratio of 2:1.

3. An ultrasonic positioning system according to claim 1, wherein the elastic body is an elastic plate slotted in the X and Y directions to form teeth capable of being mechanically deformed to produce traveling waves in the X and the Y directions.

4. An ultrasonic positioning system having multiple degrees of freedom of movement comprising:
    (a) a plurality of piezoelectric ceramic elements, each capable of an elastic deformation response when an electrical signal is applied thereto, bonded in electrical contact with respective electrodes;
    (b) an elastic body bonded in physical contact with deformable surfaces of the ceramic elements;
    (c) a moving body movably supported in physical contact on the elastic body;
    (d) wherein the ceramic elements are grouped in pairs of adjacent ceramic elements of opposite deformation responses aligned in a first direction, and also pairs of adjacent ceramic elements of opposite deformation responses aligned in a second direction; and
    (e) means, including respective electrodes bonded to the ceramic elements, for applying an alternating electrical signal to produce a cyclic deformation response in the ceramic element pairs aligned in the first direction to produce a traveling wave for moving the moving body in the first direction, and for applying another alternating electrical signal to produce a cyclic deformation response in the ceramic element pairs aligned in the second direction to produce a traveling wave for moving the moving body in the second direction, whereby at least two degrees of freedom of movement in the first and second directions are obtained;
wherein the electrodes, ceramic elements, and elastic body are arranged in four linear beams, with two beams aligned in parallel in the X direction and two beams in parallel in the Y direction, and a movable rotor is supported as the moving body in preloaded contact on the beams, and when excitation signals are applied to each two parallel beams to generate travelling waves in the same X or Y direction, linear movement of the rotor in the X or Y direction results, and when excitation signals are applied to each two parallel beams to generate travelling waves in the opposite X or Y direction, rotary motion of the rotor results, whereby three degrees of freedom of movement are obtained.

5. An ultrasonic positioning system according to claim 4, wherein the linear beams are arranged in a square configuration around a central opening in a planar support plate, and the rotor is assembled in preloaded contact on the beams by first preloading means including a bearing in contact with the rotor and supporting a shaft on one planar side of the support plate, and by second preloading means including an anti-friction disk on an opposite planar side of the support plate, and wherein the preloading shaft extends through the central opening in the support plate and is coupled to the preloading disk, such that the assembly of the rotor, first preloading means, and second preloading means can move together in the X and Y directions and in rotary motion on the support plate, and the shaft coupling the assembly together can move within the space of the central aperture of the support plate.

6. An ultrasonic positioning system according to claim 5, wherein the preloading disk includes anti-friction means provided between the disk and the opposite planar side of the support plate to allow the rotor assembly to move without resistance.

7. An ultrasonic positioning system according to claim 6, wherein the anti-friction means are piezoelectric ceramic elements that are vibrated during movement of the rotor assembly in the X and Y directions to provide a low coefficient of friction between the support plate and the disk.

8. An ultrasonic positioning system according to claim 1, wherein said array of ceramic elements capable of vibrating in two modes are arranged to form a spherical surface, wherein the ceramic elements have one dimension thereof aligned in a pitch direction and another dimension thereof aligned in a yaw direction, and the moving body is driven in two degrees of freedom of pitch and yaw movement over the spherical surface.

9. An ultrasonic positioning system according to claim 8, wherein said array of ceramic elements are arranged to form upper and lower half-spherical surfaces which are assembled together to form the spherical surface, and upper and lower moving bodies are supported in preloaded contact with the respective half-spherical surfaces and are coupled together to be driven with a doubled output of driving force.

10. An ultrasonic positioning system according to claim 1, wherein said array of ceramic elements capable of vibrating in two modes are arranged to form an upper half-spherical surface, wherein the ceramic elements have one dimension thereof aligned in a pitch direction and another dimension thereof aligned in a yaw direction, and a second array of ceramic elements are arranged to form a lower half-spherical surface, wherein the ceramic elements are arranged in curvilinear beams aligned in a converging direction for driving a moving body thereon in rotary motion, and upper and lower moving bodies are supported in preloaded contact, respectively, with the upper half-spherical surface for driving in pitch and yaw directions and with the lower half-spherical surface for driving in a roll motion, whereby three degrees of freedom of movement are obtained.

\* \* \* \* \*